G. C. MANNER.
Upright Pianos.
No. 5,470. Reissued July 1, 1873.
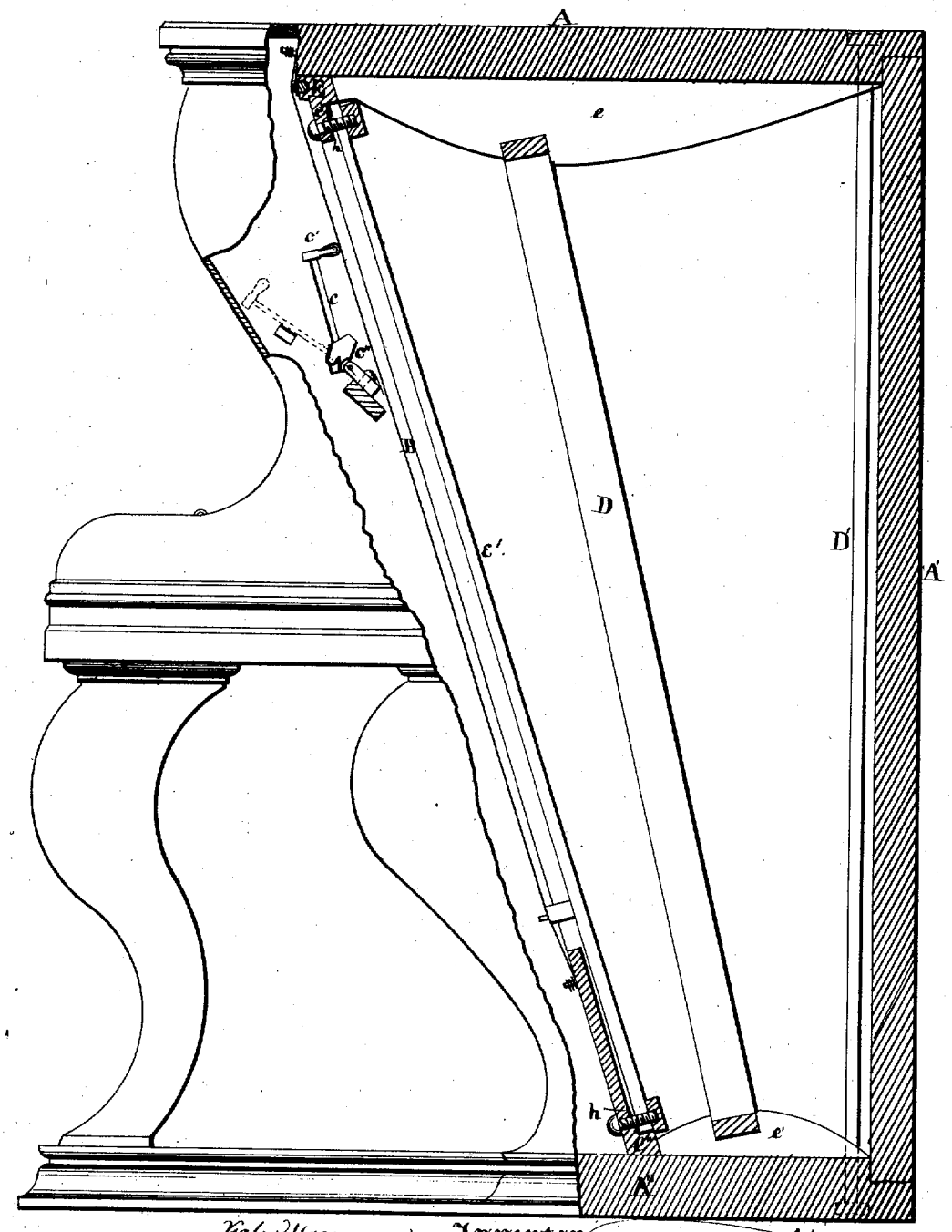
Witnesses. Victor Hagmann, S. Kemon
Inventor. G. C. Manner per Munn & Co. Attorneys.

UNITED STATES PATENT OFFICE.

G. C. MANNER, OF NEW YORK, N. Y.

IMPROVEMENT IN UPRIGHT PIANOS.

Specification forming part of Letters Patent No. 97,943, dated December 14, 1869; reissue No. 5,470, dated July 1, 1873; application filed January 8, 1870.

*To all whom it may concern:*

Be it known that I, GEORGE C. MANNER, of the city, county, and State of New York, have invented a new and useful Improvement in Upright Pianos; and I do hereby declare that the following is a full, clear, and exact description of the construction and operation of the same, reference being had to the accompanying drawing forming part of this specification, in which the figure is a longitudinal vertical section.

This invention consists, chiefly, in so inclining the frame, sounding-board, and strings of an upright piano, between the bottom piece of the supporting-frame and the top or rest piece of the same, that thereby the length of the strings will be increased, and more room for the action obtained.

Ordinarily, the strings of upright pianos are stretched perpendicularly; thereby the hammer cannot be conveniently pivoted to fall back after each blow, and the length of strings is also insufficient. I am aware that inclined strings have already been proposed.

I extend my inclined strings, as aforesaid, from the bottom piece to the top of the supporting-frame, and do thereby actually increase their length, besides obtaining the other advantages claimed for inclined strings, and without increasing the height of the piano. The invention consists, further, in beveling the lower edge of the frame, which sustains the strings, so that it will stand inclined on the supporting-frame. This invention consists, also, in placing the ends of the supporting-beams, that extend from the bottom to the top of upright piano-frames, at points between the front and rear sides of the top piece, and between the front and rear sides of the bottom piece, instead of at the rear sides of such pieces, as heretofore, for the purpose of enabling the said beams to render a better support to the top piece against the strain of the strings. Also, in connecting the sounding-board with an iron inclosing-frame, so shaped that the sounding-board shall receive a bellying form toward the strings when the screws which confine them to the frame are driven home.

In the drawing, A is the top or rest piece. A′ A′ are the side pieces, and A″ the bottom piece of the supporting-frame of an upright piano. B are the inclined strings. It will be seen that by stretching the strings in an inclined position their length is increased, and the "action" may be located at a point which shall give it all necessary room, and which shall also be out of the vertical plane in which lies the point of contact between the hammer-head C′ and strings. This location compels the hammer C to fall back after every blow, by its own weight. It also enables the stop that limits the backward fall of the hammer to be placed at a point whence the hammer, on rising, gains enough momentum to deliver a blow of the requisite force. D are supporting-beams, placed between the top and bottom pieces A A″.

Usually, the supporting-beams of upright pianos are vertical, like the strings, and are located at the extreme rear side of the frame. As their function is to sustain the frame against the strain of the strings, it is obvious that such a location prevents them from discharging this function to the best advantage, inasmuch as the strain has in its favor the leverage of the entire width of the top and bottom pieces.

My plan is to place the ends of the beams in lines, midway or otherwise of the width of the top and bottom pieces, and to pass vertical stay-rods D′ between the rear sides of such pieces, such stay-rods having screws and nuts at their ends. In this way the leverage that before was all in favor of the strain is now turned against it, by so much as the ends of the beams are brought nearer the front sides of the top and bottom pieces, where they serve as fulcrums, the power being applied by the strings, and the resistance being supplied by the stay-rods.

E shows an iron frame sustaining the plate, to which the lower ends of the strings are attached, and provided with arms *e e′*, projecting horizontally rearward from top to bottom, between which arms the supporting-beams are placed, the upper ones, *e*, sustaining the top-piece A, and the lower ones, *e′*, resting on the bottom piece A″. The frame and its arms may all be cast in one piece.

The lower edge of the frame E, it will be seen, is beveled, and that of the lower arms, $e'$, also, at an obtuse angle to its front face, so that thereby the inclined position of said frame E, and of the strings which it holds is produced. The frame E stands upon the bottom piece A″, and extends up to the top piece A. The strings B extend, therefore, also downward from the key-board, the action being applied to their upper parts, as shown.

The frame completely incloses the edge of the sounding-board E′ in a rabbet, $e''$, that face of the rabbet on which the sounding-board rests being concave transversely, so that when the sounding-board is screwed down into the rabbet, it shall take a bellying form toward the strings, in the same manner and upon the same principle as a violin, so as to allow for expansion and contraction, and favorably affect the tone of the instrument.

The sounding-board, being affixed by screws to its frame, may be easily taken off at any time.

Packing, $h$, of any suitable material, is placed between the sounding-board and the faces of the rabbet, so as to prevent the frame from rattling.

Having thus described my invention, I claim as new and desire to secure by Letters Patent—

1. In an upright piano having its strings inclined downward from the upper front to the rear, arranged above and below the key-board and in front of the sounding-board, the hammers C placed near the upper end of said strings and pivoted back of the striking-point of said hammers, substantially as and for the purpose set forth.

2. The supporting-beams D, placed so that their ends occupy points between the front and rear sides of the top and bottom pieces, substantially as and for the object explained.

3. The frame E, provided with the concave rabbet $e''$, for the purpose of giving the sounding-board a bellying form, substantially as and for the object specified.

G. C. MANNER.

Witnesses:
A. V. BRIESEN,
ALEX. F. ROBERTS.